United States Patent
Schenk

(10) Patent No.: US 6,431,781 B1
(45) Date of Patent: Aug. 13, 2002

(54) CERAMIC TO METAL JOINT ASSEMBLY

(75) Inventor: Bjoern Schenk, Phoenix, AZ (US)

(73) Assignee: Honeywell International, Inc., Morristown, NJ (US)

( * ) Notice: Subject to any disclaimer, the term of this patent is extended or adjusted under 35 U.S.C. 154(b) by 1 days.

(21) Appl. No.: 09/594,915

(22) Filed: Jun. 15, 2000

(51) Int. Cl.⁷ .............................. F16B 9/00; F01D 5/28
(52) U.S. Cl. ..................... 403/29; 403/30; 403/273; 416/244 A
(58) Field of Search ..................... 403/29, 30, 404, 403/361; 416/244 A

(56) References Cited

U.S. PATENT DOCUMENTS

| | | | |
|---|---|---|---|
| 2,443,688 A | 6/1948 | McFarland | |
| 3,019,039 A | 1/1962 | Clavell | |
| 4,147,468 A | 4/1979 | Murakami et al. | |
| 4,281,941 A | * 8/1981 | Rottenkolber | 403/29 |
| 4,325,647 A | * 4/1982 | Maier et al. | 403/29 |
| 4,417,855 A | 11/1983 | Jepsen | |
| 4,610,934 A | * 9/1986 | Boecker et al. | 428/627 |
| 4,722,630 A | * 2/1988 | Fang | 403/30 |
| 4,772,139 A | 9/1988 | Bretton | |
| 4,798,493 A | * 1/1989 | Oda et al. | 403/404 |
| 4,836,750 A | 6/1989 | Modafferi et al. | |
| 4,886,695 A | 12/1989 | Mizuno et al. | |
| 4,908,256 A | * 3/1990 | Oda et al. | 428/133 |
| 4,915,589 A | 4/1990 | Gessler et al. | |
| 4,984,927 A | 1/1991 | Kojima et al. | |
| 5,020,932 A | 6/1991 | Boyd | |
| 5,066,547 A | * 11/1991 | Ishida et al. | 428/627 |
| 5,108,025 A | * 4/1992 | Kang et al. | 403/404 X |
| 5,279,211 A | * 1/1994 | Bentz et al. | 403/361 X |
| 5,435,234 A | * 7/1995 | Bentz et al. | 403/361 X |
| 5,747,428 A | * 5/1998 | Khorramian | 508/151 |
| 6,270,318 B1 | * 8/2001 | Shah et al. | 416/193 A |

FOREIGN PATENT DOCUMENTS

| | | | |
|---|---|---|---|
| JP | 58-178803 A | * | 10/1983 |
| JP | 58-217702 A | * | 12/1983 |
| JP | 58-220901 A | * | 12/1983 |
| JP | 61-008410 A | * | 1/1986 |

* cited by examiner

Primary Examiner—Lynne H. Browne
Assistant Examiner—Ernesto Garcia
(74) Attorney, Agent, or Firm—Robert Desmond, Esq.

(57) ABSTRACT

A joint assembly for coupling a ceramic member to a metal member is comprised of a ceramic shaft portion attached to the ceramic member; a slotted shrink fitter formed of a first metal and disposed around and in torque transmitting contact with the ceramic shaft portion to define a first interface surface therebetween; and a sleeve formed of a second metal disposed around and in torque transmitting contact with the shrink fitter to define a second interface surface therebetween. Either the shrink fitter or the sleeve attached to the metal member. The coefficient of thermal expansion of the second metal is relatively low compared to that of the first metal and the diameters of the first interface, ($d_1$), and the second interface, ($d_2$), are determined from the equation, $d_1/_2=(\alpha_c-\alpha_1)/(\alpha-\alpha_1)$ where $\alpha_c$, $\alpha_1$ and $\alpha_2$ are the coefficients of thermal expansion of the ceramic, the first metal and the second metal respectively. A compliant sleeve is disposed the ceramic shaft portion and the slotted shrink fitter.

10 Claims, 3 Drawing Sheets

CERAMIC TO METAL JOINT ASSEMBLY

TECHNICAL FIELD this invention relates generally to gas turbine engines and in particular to a joint assembly for coupling a ceramic member to a metal member.

BACKGROUND OF THE INVENTION

It has long been recognized that the efficiency and performance of gas turbine engines could be improved by increasing the temperature of the gas through the turbine section. Historically, these temperatures have been limited by the materials, usually high temperature steel or nickel alloy, used in forming the turbine rotor. To permit higher gas temperatures it has been proposed to form the turbine rotor from a high density, high strength, silicon nitride, or silicon carbide ceramic which can withstand higher temperatures than steels or nickel alloys.

The ceramic turbine rotor extract energy from the hot gas in the engine and converts it into torque. To transmit this torque to other components of the engine and thereby cause them to rotate, the ceramic turbine rotor needs to be couple to a superalloy or metal component of the engine such as the compressor rotor. Because monolithic ceramic has a higher compressive strength in comparison to its tensile strength, it is advantageous to use an interference fit type joint to couple the turbine rotor to the compressor rotor. Typically, this joint is comprised of a metal sleeve pressed on to a shaft portion of the ceramic turbine rotor with the metal sleeve applying a compressive load to the ceramic shaft portion. A disadvantage to this type of joint is that due to the thermal expansion mismatch between the metal and ceramic, a conventional interference fit loses it torque transmitting capability at temperatures in the range of 400 to 500° depending on the specific metal and ceramic chosen and the magnitude of the interference fit.

Accordingly, there is a need for a joint assembly for coupling a ceramic member to a metal member that is capable of transmitting torque at temperatures greater than 500° C.

SUMMARY OF THE INVENTION

An object of the present invention is to provide a joint assembly for coupling a ceramic member to a metal member that is capable of transmitting torque at temperatures greater than 500°C.

The present invention achieves this objective by providing a joint assembly for coupling a ceramic member to a metal member that is comprised of a ceramic shaft portion attached to the ceramic member; a slotted shrink fitter formed of a first metal and disposed around and in torque transmitting contact with the ceramic shaft portion to define a first interface surface therebetween; and a sleeve formed of a second metal disposed around and in torque transmitting contact with the shrink fitter to define a second interface surface therebetween. Either the shrink fifter or the sleeve attached to the metal member. The coefficient of thermal expansion of the second metal is relatively low compared to that of the first metal and the diameters of the first interface, ($d_1$), and the second interface, ($d_2$), are determined from the equation, $d_1/d_2=(\alpha_c-\alpha_1)/(\alpha_2-\alpha_1)$ where $\alpha_c$, $\alpha_1$ and $\alpha_2$ are the coefficients of thermal expansion of the ceramic, the first metal and the second metal respectively.

By selecting the appropriate metals and interface diameters, the contact pressure, which is directly related to torque transmitting capability, between the ceramic to metal interface will remain essentially constant even at temperature above 500° C.

These and other objects, features and advantages of the present invention, are specifically set forth in, or will become apparent from, the following detailed description of a preferred embodiment of the invention when read in conjunction with the accompanying drawings.

DESCRIPTION OF THE PREFERRED EMBODIMENT

Figure 1:
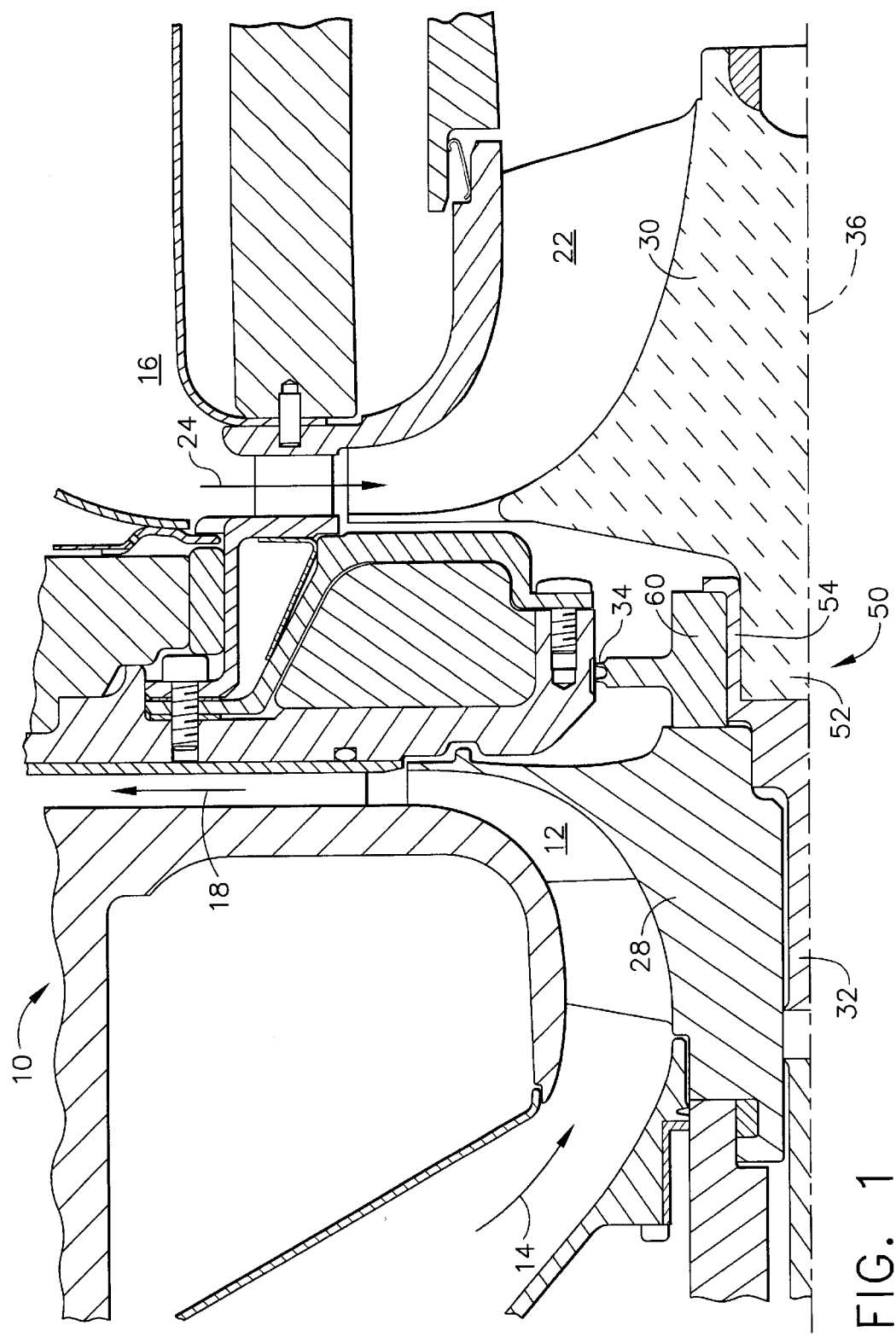
FIG. 1 is a cross-sectional view of a portion of a gas turbine engine incorporating the joint assembly contemplated by the present invention as shown in FIG. 2.

FIG. 1 shows a cross-section of a gas turbine engine generally denoted by the reference numeral 10. The gas turbine engine 10 includes a compressor section 12 which in operation ingests air, either from ambient or from another compressor downstream, as indicated by arrow 14 and delivers this air pressurized to a combustion section 16, only partially shown, as indicated by arrow 18. Fuel and air are mixed in the combustion section and ignited to produce a flow of hot, pressurized combustion gas that flows through a turbine section 22 as indicated by arrow 24. The gas expands across the turbine section 22 causing it to rotate and produce shaft horsepower for driving the compressor section 12 and other components in the engine.

The rotating assembly of the engine 10 shown in FIG. 1 includes a compressor wheel 28, a turbine wheel 30, a tie shaft 32 and a joint assembly 50. The compressor wheel 28 and turbine wheel 30 are disposed in back-to-back relation and are axially spaced apart to define an annular groove therebetween. Disposed within the groove are sections of the engine's static structure. At the radially inner end of the groove is a seal 34. The turbine wheel 30 is made of a ceramic such as silicon nitride $Si_3N_4$ or a silicon carbide and the compressor wheel 28 and tie shaft 32 are made of conventional gas turbine engine metals.

Figure 2:
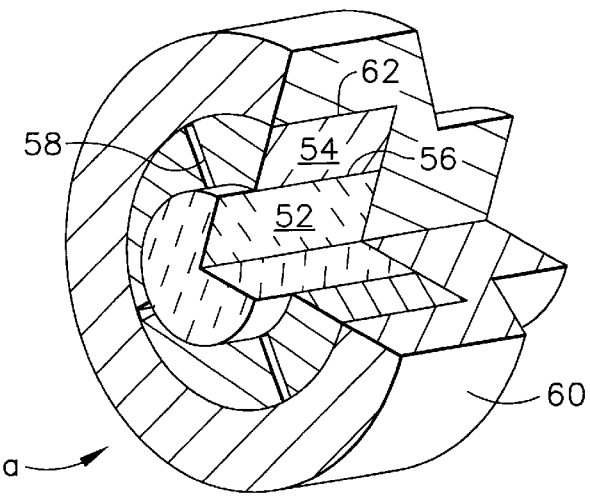
FIG. 2 is a cutaway perspective view of the joint assembly contemplated by the present invention.

Referring to FIGS. 1 and 2, the joint assembly 50 includes a ceramic stub shaft or portion 52 that is integral with the ceramic turbine wheel 30. The stub shaft 52 lies along the engine centerline 36 and has an axial end adjacent to an axial end of the tie shaft 32. The joint assembly 50 further includes an annular shrink fitter 54 which is shrunk fit onto the stub shaft 52 to form a torque transmitting, interference fit and also to define a first interface surface 56 therebetween. The shrink fitter 54 is integral with the shaft 32 or alternatively can be coupled to the shaft 32. In one embodiment, the shrink fitter 54 is a single piece having a plurality of circumferentailly spaced apart, longitudinally extending slots 58 the significance of which will be explained later.

In the preferred embodiment, there should be at least 4 slots 58 equally spaced in circumferential direction. The slots 58 should extend over the entire length of the ceramic stub shaft 52.

Figure 3:
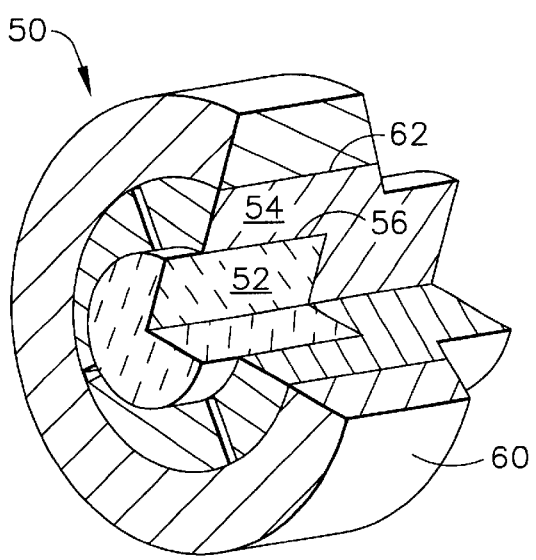
FIG. 3 is a cutaway perspective view of an alternative embodiment of the joint assembly contemplated by the present invention.

Referring now to FIG. 3, the shrink fitter 54 may alternatively be comprised of a plurality of parts separated by a plurality of circumferentially spaced apart, longitudinally extending gaps 58, as seen in FIG. 3. A sleeve 60 is shrunk onto the shrink fitter 54 to form an interference fit and to define a second interface surface 62 therebetween.

The sleeve 60 may be separate from shaft 32, as seen in FIG. 2 and FIG. 1, or may be integral with the shaft 32, as seen in FIG. 3, and may have one axial surface that abuts the back surface of the compressor wheel 28, as more clearly seen in the embodiment shown in FIG. 1. Sleeve 60 may also have an outer surface that defines the rotating component of the seal 34, as seen in FIG. 1. FIG. 3 shows an alternative embodiment of the joint assembly 50a, where the sleeve 60 is integral with the tie shaft 32, instead of the shrink fitter 54 being integral with the tie shaft 32, as in the embodiment shown in FIG. 1 and FIG. 2.

Figure 4:
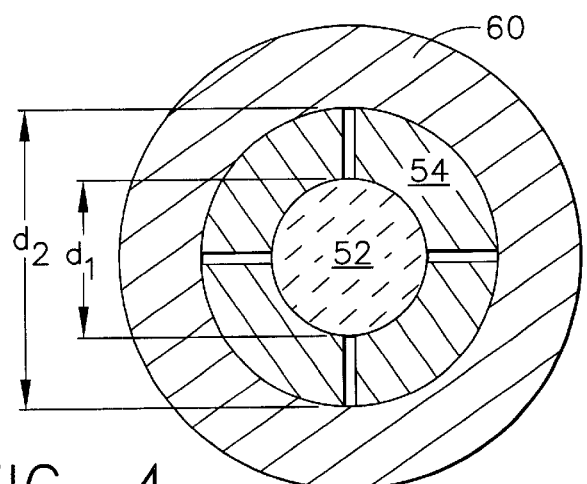
FIG. 4 is a front view of the joint assembly of FIGS. 2 and 3.

Referring to FIG. 4, the diameter of the first interface 56, $d_1$, and the diameter of said second interface 62, $d_2$ are determined from the following equation, $$d_1/d_2 = (\alpha_c - \alpha_1)/(\alpha_2 - \alpha_1)$$

where $\alpha_c$ is the coefficient of thermal expansion of ceramic used to form the stub shaft 52, $\alpha_1$ is the coefficient of thermal expansion of the metal used to form the shrink fitter 54 and $\alpha_2$ is the coefficient of thermal expansion of the metal used to form the sleeve 60.

In the preferred embodiment, the metal used to form the sleeve 60 is selected from the group consisting of inconel 783 and incoloy 909 and the metal used to form the shrink fitter 54 is selected from the group consisting of inconel 718 and nimonic 90. In selecting the metals, it is important that the following relationship of coefficients of thermal expansion be maintained:

$$\alpha_c < \alpha_2 < \alpha_1$$

Figure 5:
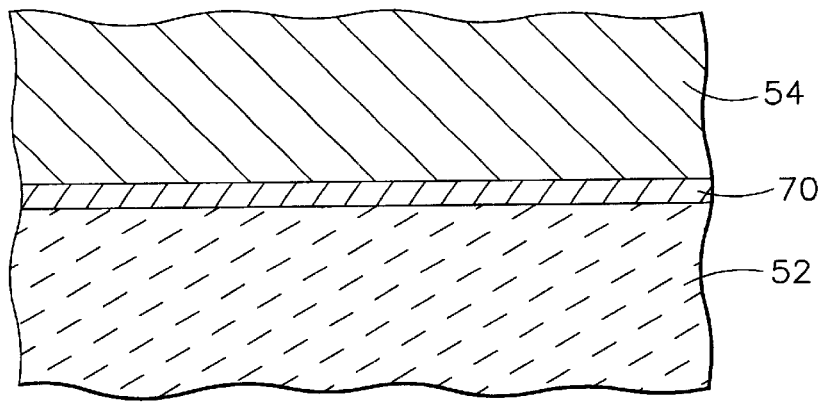
FIG. 5 is an enlarged view of one embodiment of an interface surface of the present invention.

Referring to FIG. 5, a layer of a solid lubricant 70 is deposited on the inner surface of the shrink fitter 54 at the first interface 56. Preferably, the solid lubricant 70 is gold though any other noble metal may be used.

Figure 6:
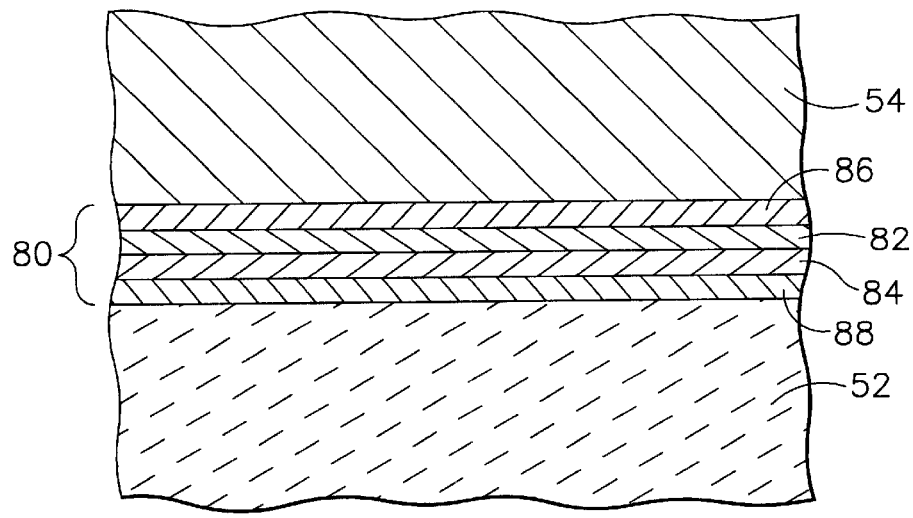
FIG. 6 is an enlarged view of another embodiment of an interface surface of the present invention.

Alternatively, see FIG. 6, a compliant sleeve 80 may be disposed between the ceramic stub shaft 52 and the shrink fitter 54 at the first interface 56. The compliant sleeve 80 is of the type disclosed in copending U.S. patent application Ser. No. 09/083,394 which is assigned to the assignee of this application and which is incorporated by reference to the extent necessary to understand the present invention. The compliant sleeve 80 includes a superalloy substrate 82 having an outer and an inner surface. A soft metal layer 84 covers the inner surface with the soft metal selected to have yield strength less than the yield strength of the substrate. The soft metal is preferably selected from a group consisting of nickel, cobalt, platinum, platinum and rhodium, nickel oxide, cobalt oxide and combinations thereof. Alternatively, the soft metal may include at least one layer selected from a group consisting of nickel, cobalt, platinum, platinum and rhodium, and an oxide layer over the one layer.

A first lubricant layer 86 is deposited over the outer surface of the substrate 82 and is preferably is a lubricious oxide, more preferably cobalt oxide. Also, a second lubricant layer 88 is deposited over the soft metal layer 84. In the preferred embodiment, the second lubricant is selected from a group consisting of gold, silver, molten glasses, boron nitride and boron oxides, with gold being the most preferred.

During operation of the engine 10, the slots 58 serve to reduce the hoop stresses generated in the shrink fitter 54 as its radial thermal expansion is suppressed by the sleeve 60. The slots 58 allow the shrink fitter 54 to translate its hindered radial thermal expansion displacements into tangential displacements thereby slowly decreasing the width of the slots 58. This results in enhance contact between the shrink fitter 54 and the ceramic stub shaft 52, thereby preventing a degradation in the torque transmitting capability.

Further, by selecting the appropriate metals and interface diameters, the contact pressure, which is directly related to torque transmitting capability, between the ceramic to metal interface will remain essentially constant even at temperature above 500° C.

A further advantage to the present invention is that the axial load applied by the tie shaft 32 is not transmitted through a ceramic member 52, which cannot withstand high tensile loads.

Various modifications and alterations to the above-described preferred embodiment will be apparent to those skilled in the art. Accordingly, these descriptions of the invention should be considered exemplary and not as limiting the scope and spirit of the invention as set forth in the following claims.

What is claimed is:

1. A joint assembly comprising:
   a ceramic shaft portion integral with a ceramic member;
   a shrink fitter formed of a first material disposed around and in torque transmitting contact with said ceramic shaft portion defining a first interface surface therebetween;
   a sleeve formed of a second material disposed around and in torque transmitting contact with said shrink fitter to define a second interface surface therebetween; and
   one of said shrink fitter and said sleeve integral with a metal member,
   wherein the diameter of said first interface surface, $d_1$, and the diameter of said second interface surface, $d_2$, are related as $$d_1/d_2 = (\alpha_c - \alpha_1)/(\alpha_2 - \alpha_1),$$

where $\alpha_c$ is the coefficient of thermal expansion of said ceramic shaft portion, $\alpha_1$ is the coefficient of thermal expansion of said first material, and $\alpha_2$ is the coefficient of thermal expansion of said second material.

2. The assembly of claim 1 wherein said torque transmitting contact is an interference fit.

3. The assembly of claim 1 wherein the coefficient of thermal expansion of said first material is greater than the coefficient of thermal expansion of said second material which is greater than the coefficient of thermal expansion of said ceramic shaft portion.

4. The assembly of claim 1 wherein the material of said ceramic shaft portion is selected from a group consisting of silicon nitride and silicon carbide.

5. The assembly of claim 1 wherein said shrink fitter is integral with said metal member.

6. The assembly of claim 1 wherein said shrink fitter has a plurality of circumferentially spaced apart, longitudinally extending slots, whereby, during operation of the assembly, a width of each of the slots decreases to translate a hindered radial expansion displacement of said shrink fitter into circumferential displacement.

7. The assembly of claim 1 wherein said sleeve is integral to said metal member.

8. The assembly of claim 7 wherein said shrink fitter has a plurality of circumferentially spaced apart, longitudinally extending slots, whereby during operation of the assembly the width of each of the slots decreases to translate a hindered radial expansion displacement of said shrink fitter into circumferential displacement.

9. The assembly of claim 7 wherein said shrink fitter is comprised of a plurality of parts circumferentially spaced apart which define a longitudinally extending gap between adjacent said whereby during operation of the assembly the width of each of the gaps decreases to translate a hindered radial expansion displacement of said shrink fitter into circumferential displacement.

10. The assembly of claim 1 wherein the material of said ceramic shaft portion is a brittle, high-temperature material.

\* \* \* \* \*

UNITED STATES PATENT AND TRADEMARK OFFICE
CERTIFICATE OF CORRECTION

PATENT NO.    : 6,431,781 B1
DATED         : August 13, 2002
INVENTOR(S)   : Bjoern Schenk It is certified that error appears in the above-identified patent and that said Letters Patent is hereby corrected as shown below:

<u>Column 3,</u>
Lines 42-43 the equation should read:
-- $\alpha_c < \alpha_2 < \alpha_1$ --

Signed and Sealed this

Twenty-eighth Day of January, 2003

JAMES E. ROGAN
*Director of the United States Patent and Trademark Office*